United States Patent [19]

Wojtkowiak

[11] Patent Number: 4,791,734

[45] Date of Patent: Dec. 20, 1988

[54] GAP SETTING TOOL FOR OIL BURNER IGNITER ELECTRODES

[75] Inventor: Leonard S. Wojtkowiak, Haddon Heights, N.J.

[73] Assignee: Retrofit Specialties, Inc., Haddon Heights, N.J.

[21] Appl. No.: 91,921

[22] Filed: Sep. 1, 1987

[51] Int. Cl.⁴ .............................................. G01B 3/30
[52] U.S. Cl. ...................................... 33/652; 431/264
[58] Field of Search ................. 431/258, 264; 33/645, 33/652; 73/866.5; 445/3, 7, 63, 67; 29/270

[56] References Cited

U.S. PATENT DOCUMENTS

| | | | |
|---|---|---|---|
| 2,135,296 | 11/1938 | Towne | 33/652 |
| 2,498,823 | 2/1950 | Peterson | 33/652 |
| 2,656,615 | 10/1953 | Rowell | 33/652 |
| 2,896,334 | 7/1959 | Dunderman | 33/652 |

*Primary Examiner*—Samuel Scott
*Assistant Examiner*—Noah Kamen

*Attorney, Agent, or Firm*—Pollock, Vande Sande & Priddy

[57] ABSTRACT

A tool for setting the width of a space between the tips of a pair of burner ignition electrodes so that an electrical spark will jump this gap, and the axial and radial distances of these tips forward of the center of a fuel nozzle outlet so that fuel discharged by the nozzle will be ignited smoothly and will not cause carbon deposits to build up on the tips. The nozzle is removably threaded in a threaded opening of a fuel supply pipe and is replaced by the tool during the setting operation. The tool has a threaded shank and a stop flange for supporting and positioning an annular groove of the tool so as to receive and set the ends of the electrode tips in the correct position. The groove is in an annular face formed by a shoulder of the tool and has an outer wall for holding the ends of radially extending electrode tips in the groove as the tool is rotated into a seated position in the fuel supply pipe opening.

12 Claims, 1 Drawing Sheet

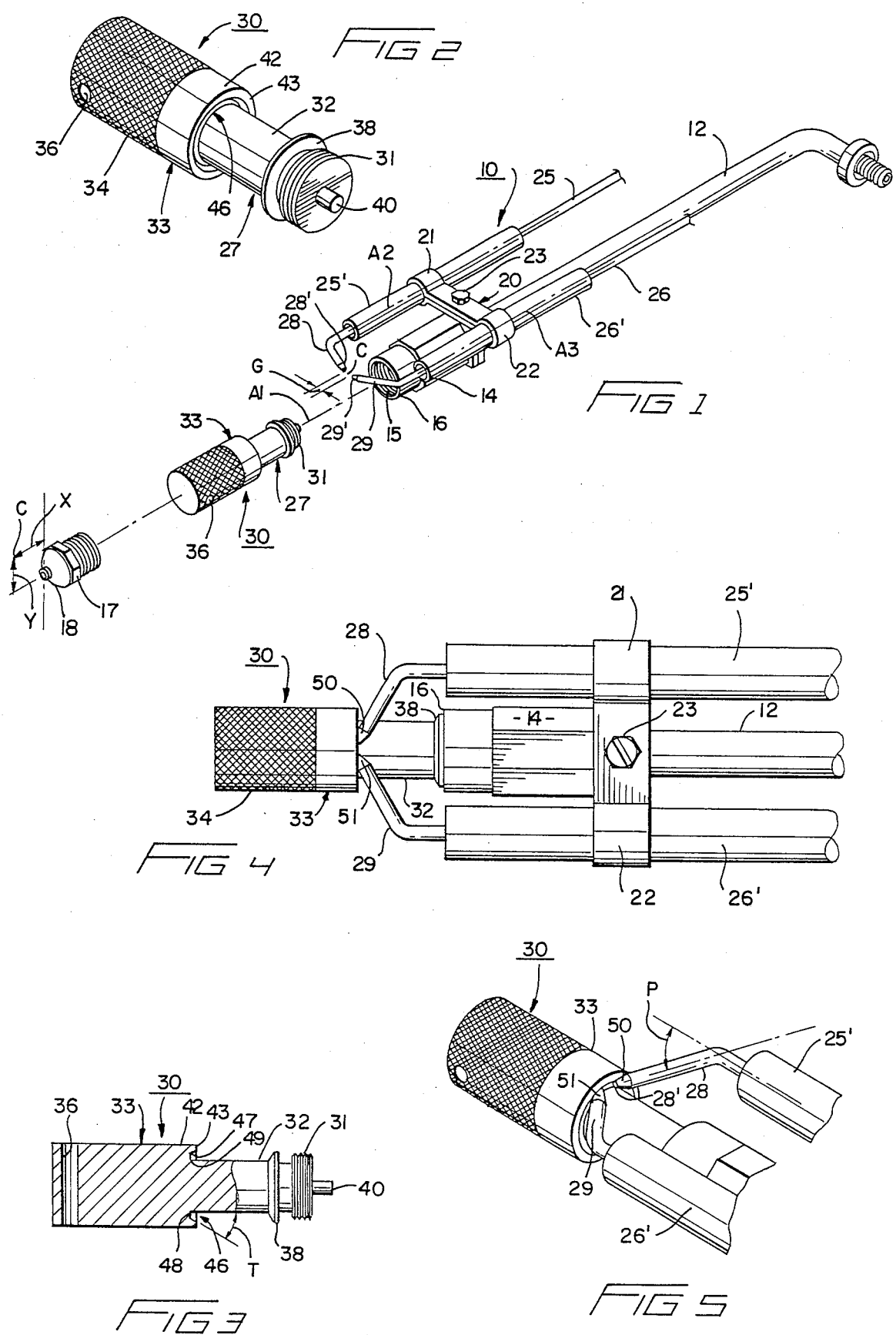

GAP SETTING TOOL FOR OIL BURNER IGNITER ELECTRODES

TECHNICAL FIELD

This invention relates to tools for setting burner ignition electrodes; more particularly to a tool for setting the width of a space between the tips of a pair of burner ignition electrodes so that an electrical spark will jump this gap, and the axial and radial distances of these tips forward of the center of a fuel nozzle outlet so that fuel discharged by the nozzle will be ignited smoothly and will not cause carbon deposits to build up on the tips.

BACKGROUND OF THE INVENTION

Oil burners employ a nozzle at the end of a fuel supply pipe to atomize liquid fuel oil and provide a diverging spray of small fuel oil droplets which can be readily ignited and burned. The atomized spray is ignited by a pair of electrodes having tips or points the ends of which are spaced apart to provide a spark gap. The electrodes are connected to a source of electrical power which produces an ignition spark when the gap is jumped by an electric current.

The width of the spark gap and the positioning of this gap relative to the atomized spray are critical. The width of the spark gap must be such that the electric current will jump the gap under the conditions at which the burner operates. For example, the gap width must provide a strong spark in the turbulent air currents caused by the fuel spray and each electrode must be positioned to prevent sparks from jumping to any other metal parts. The electrode tips also must remain out of the path of the spray droplets by a distance sufficient to prevent the formation of carbon deposits, but sufficiently close to the spray to ensure ignition of the fuel. If a failure of ignition results from an improper size or location of the gap, fuel may continue to enter the combustion chamber where an accumulated amount of liquid fuel may itself cause damage or be subsequently ignited with undesirable consequences, such as distribution of soot and/or fumes beyond the confines of the combustion chamber.

The adjustment of electrodes in conventional oil burners has been a tedious and exacting job in the past. The electrode tips must be positioned so as not to be wetted by the spray but close enough to it so that a spark across the gap will reliably ignite the spray and cause it to burn as a flame. The distance between the free ends of the electrode tips establishes the width of the spark gap, for example ⅛ inch, and this width must be set with a high degree of accuracy relative to the current and voltage available so as to provide the level of spark required. In addition, the position of the center of the gap must be set very precisely at a specific radial distance from the axis of the nozzle outlet and opposite a point on this axis that is located at a specific distance forward of the center of the nozzle outlet. In this specification, "setting" the spark gap means accomplishing all of these adjustments.

DISCLOSURE OF THE INVENTION

It is therefore an object of the present invention to provide a tool which facilitates the adjustments required to properly position and set the width of the spark gap between the ends of fuel ignition electrodes. While a preferred use of the invention is to position and set the gap between the spaced apart ends of oil burner electrodes, the invention may be employed for setting other types of fuel ignition electrodes, such as those for igniting fuels other than oil, whether liquids or gases, as discharged from appropriate nozzles, ports, or other outlet elements.

Another object of the invention is to provide a gap positioning and setting tool of unitary construction which is inexpensive to manufacture and simple and economical to use, and which supports the tips of the electrodes in their set positions while the main body of each electrode is being securely clamped in its corresponding position. These and other objects and advantages of the invention will become apparent to a person skilled in the art from this specification and the accompanying drawing.

The invention provides a one piece hand tool for setting a spark gap between the ends of the tips of a pair of electrodes for igniting a fuel discharge, such as a conical fuel oil spray formed by the outlet of a discharge nozzle threaded into a threaded opening at the end of a fuel oil supply pipe. The tool includes a shank with a smooth cylindrical portion or neck at one end and a threaded portion at the other end. A radially extending stop member is carried by the shank adjacent to the inner end of the threaded portion, and a handle member is connected to the neck of the shank in spaced relation to the stop member. The handle and the shank together form an elongated tool body. Although this tool body is preferably a unitary structure machined from a single elongated rod or bar, it may optionally be made in sections which are then fixed together by threads, welding, swaging or the like.

The radial extent of the handle member is substantially greater than the diameter of the smooth cylindrical portion of the shank to provide a shoulder having a radially extending annular face facing toward the threaded portion of the shank. An annular groove is provided in the annular face of the shoulder for holding the ends of the tips of the electrodes in a seated position relative to each other as the tool body is rotated about its longitudinal axis with the threaded portion of the shank engaged with the threads of the fuel supply pipe opening. The annular groove has an outer wall provided by the handle and an inner wall provided by a section of the smooth cylindrical neck of the shank.

When the tool is used, the discharge nozzle is unscrewed and removed, then the threaded portion of the shank is screwed into the threaded opening of the fuel supply pipe to support the tool in position for positioning and setting the spark gap. The stop member is located adjacent to the inner end of the threaded portion of the shank so as to abut the end of the fuel supply pipe when the threaded portion of the shank is fully engaged by the threads of the fuel supply pipe opening, thereby establishing the seated position of the tool. When the tool is in its seated position, the walls of the annular groove position the tip ends relative to each other to set the spark gap at a preselected width and position the tip ends relative to the end of the fuel supply pipe to set this spark gap at preselected radial and axial distances from the position of the center of the fuel outlet when the discharge nozzle is returned to its seated position in place of the tool.

The tips of the electrodes extend radially in a plane at an acute angle relative to the axis of the discharge outlet and are preferably tapered adjacent to the free ends thereof. The shape of the outer wall of the groove and the values of the acute angle and the taper are such that the outer groove wall holds the seated tip ends radially inward against the inner wall of the groove as provided by a section of the smooth cylindrical neck of the shank. The diameter of the smooth cylindrical neck is such that when the tip ends are seated against the inner wall of the groove the spark gap is set at the preselected width for which the tool is designed.

The handle of the tool may include a knurled portion to provide a friction grip, and an aperture may be provided laterally through the handle for receiving a tether to hang the tool on a support when it is not in use. The tool may further include a gap measuring feeler gauge having a dimension corresponding to the preselected width of the spark gap. This feeler gauge may be used to check the accuracy of the gap width after each gap setting operation, and preferably comprises a small rod extending axially from the threaded end of the shank and having a diameter substantially equal to the preselected width of the spark gap.

BRIEF DESCRIPTION OF THE DRAWINGS

The features, operation and advantages of the present invention may be further understood from the detailed description below taken in conjunction with the accompany drawings in which:

FIG. 1 is an exploded perspective view illustrating the substitution of the tool of the invention for the atomizing nozzle of an oil burner assembly;

FIG. 2 is a perspective view of the tool of the invention for setting the spark gap between the tips of a pair of fuel ignition electrodes;

FIG. 3 is an elevational view of the tool of FIG. 2 in partial section;

FIG. 4 is a fragmentary plan view illustrating the tool of the invention installed in the oil burner assembly in place of the atomizing nozzle; and, FIG. 5 is a fragmentary perspective view of the installed tool of FIG. 4 showing the relationship between the electrode tips and an annular groove in the shoulder of the tool.

DETAILED DESCRIPTION OF BEST MODE EMBODIMENT

Referring to FIG. 1 of the drawings, there is shown a conventional oil burner assembly, generally designated 10, which includes a fuel supply pipe 12 having an adaptor 14. At the discharge end of adaptor 14 is a threaded opening 15 for receiving the threads of a removable fuel oil discharge nozzle 17, which has an outlet 18 at its tip for providing a conical spray of atomized liquid fuel oil. Supported on pipe 12 is a T-shaped mounting fixture 20 having a pair of clamping arms 21 and 22 operable by a clamping screw 23 for adjustably fixing the position of a pair of ignition electrodes 25 and 26, respectively. Surrounding the midportion of electrodes 25 and 26 are electrical insulators 25' and 26', and the inner ends of electrodes 25 and 26 are connected to a source of electrical power (not shown). The outer ends of electrodes 25 and 26 include tip portions 28 and 29, respectively. Tip portion 28 has a free end 28' and tip portion 29 has a free end 29', free ends 28' and 29' defining therebetween a spark gap having a width G and a center point C.

The spark gap width G must be precisely set to provide a strong ignition spark across the gap in response to a specific voltage differential applied between the ends 28' and 29' by the electrical power source. Also, for proper ignition of an atomized fuel oil spray without fouling up the electrodes with carbon deposits, the center point C of the spark gap must be precisely positioned at a preselected axial distance X along and at a preselected radial distance Y from the central axis A1 of outlet 18 of the discharge nozzle, when the discharge nozzle is in its seated position in threaded opening 15.

When clamping screw 23 is loosened, electrode 25 is rotatable around and slidable along its longitudinal axis A2, and electrode 26 is rotatable around and slidable along its longitudinal axis A3. The axes A1, A2, and A3 are substantially parallel and the tip portions 28 and 29 each extend radially relative to these axes in a corresponding plane that intersects these axes at an acute angle P as seen best in FIG. 5. Tip portions 28 and 29 therefore may be pivoted about the respective axes A2 and A3. These pivotal and axial adjustments permit setting the width G of the spark gap and positioning this gap relative to the center of the fuel discharge outlet 18.

In order to precisely set the width G of the spark gap and precisely position the center point C of the spark gap relative to the fuel discharge outlet 18, nozzle 17 is replaced by a tool 30 having a handle 33 and a shank 27. Shank 27 includes a smooth cylindrical portion or neck 32 and a threaded end portion 31 for engaging the threads of adaptor opening 15 at the discharge end of fuel supply pipe 12. As seen best in FIGS. 2 and 3, threaded portion 31 is at the distal end of shank 27 and smooth cylindrical portion 32 is at the opposite end where shank 27 is connected to handle 33. Handle 33 has a knurled outer surface providing a hand-gripping portion 34. Passing laterally through handle 33 is an aperture 36 for optionally receiving a thong or other tether for hanging the tool on a support when it is not in use, such as on a hook or around the neck of the user.

Adjacent to threaded portion 31 and between the threads thereof and neck 32 is an annular flange 38, which serves as a stop means by abutting the pipe end 16 of adaptor 14. The abutment between flange 38 and pipe end 16 defines the seated position of tool 30, wherein threaded portion 31 is fully engaged by the threads of opening 15. A rod type feeler gauge 40 may optionally be provided on the outer end of shank 27 beyond the threaded portion 31 to provide a means of checking the width G of the spark gap after it has been set with the tool 30. The diameter of rod 40 is substantially equal to the desired width G of the spark gap. The radial extent of at least the portion of handle 33 adjacent to its connection with shank 27 is substantially greater than the diameter of the smooth cylindrical neck 32 to provide a shoulder 42 having a radially extending annular face 43 facing toward the distal end of shank 27. Provided in annular face 43 is a concave groove 46 having an outer wall 47 and a bottom 48 defined by portions of handle 33 underlying shoulder 42. Groove 46 also has an inner wall 49 which is formed by an inwardmost section of smooth cylindrical neck 32. Outer wall 47 of annular groove 46 holds the ends 28' and 29' of electrode tips 28 and 29 in a seated position against inner cylindrical wall 49 when tool 30 is in its seated position in opening 15 such that the tip ends 28' and 29' are positioned relative to each other to set the spark gap at a preselected width G and to position the spark gap center C at a preselected radial distance Y and a preselected axial distance X relative to outlet 18 when discharge nozzle 17 replaces tool 30 and is fully seated in threaded opening 15. The axial distance X is therefore directly dependent upon the preselected length of nozzle 17 relative to the preselected length of cylindrical neck 32. This configuration also is such that the radial distance Y and the spark gap width G are directly dependent upon the diameter of inner cylindrical wall 49 of the groove.

Conventional ignition electrodes for oil burners are each usually provided with a tapered section adjacent the free end of the tip, such as shown at 50 and 51 in FIGS. 4 and 5. Where the electrodes 25 and 26 have such tapered tips, the outer wall 47 is tapered and groove 46 is shaped relative to the values of the acute angle P and the tapers of sections 50 and 51 such that the tapered outer wall 47 engages the tapered sections of the tips so that tip ends 28' and 29' are seated radially inward against inner wall 49 of the groove. With the tip ends 28' and 29' seated in this position, the diameter of the smooth neck of the shank is such that the spark gap between tip ends 28' and 29' is set at the desired preselected width G.

FIG. 3 is approximately a full scale representation of a example of a gap setting tool for use with the igniter electrodes of conventional fuel oil burners, such as CRD burner models 99, 100, 101, and 102 available from the Carlin Company. In these types of burners, the acute angle P is approximately 62° and the angle of the tapers 50 and 51 is approximately 18° relative to the longitudinal axis of electrode tips 28 and 29. As illustrated in the drawings, the ends 28' and 29' of these types of electrodes are blunted rather than sharply pointed. The blunt ends 28' and 29' may have a diameter of about 30–40 mils, preferably about 35 mils, as compared to an untapered electrode rod diameter of approximately 100 mils. For these electrode dimensions and configurations, the tool of FIG. 3 has a cylindrical neck diameter of about 490–510 mils, preferably about 500 mils, a cylindrical shoulder diameter of about 740–760 mils, preferably about 750 mils, and a groove depth of about 55–65 mils, preferably about 60 mils; and the outer wall 47 is tapered at about 40°–50°, preferably about 45°, relative to the longitudinal axis of the tool. When used with the electrodes of the conventional burners indicated, this particular tool sets the gap width at ⅛ inch and positions the center C of this gap at a radial distance Y of ¼ inch from the axis of the fuel passage through the nozzle and at an axial distance X of 3/16 inch from the center of nozzle outlet 18 along this axis. The center of nozzle outlet 18 is on the fuel passage axis and in the transverse plane which also contains the outermost tip of the portion of the nozzle forming the fuel passage.

The use of tool 30 in setting the electrodes of an oil burner of the type indicated will now be described. First, the nozzle 17 is removed from the fuel line opening 15 and the clamping screw 23 is loosened so that the electrodes 25 and 26 are loosely held in the clamping arms 21 and 22, respectively. The tool 30 is then axially aligned with opening 15 as shown in FIG. 1 and the threads 31 are started in the threads of opening 15 to provide a partial engagement between the threads of the tool and the threads of the opening. At this stage of the gap setting operation, there are two ways to proceed. One of these ways is to continue rotating the tool until the threads of the tool are fully engaged with the threads of the opening 15 and the stop flange 38 is firmly in abutment with the pipe end 16 so that the tool is in its seated position. The respective threads need to be only hand snugged to achieve this seated position of the tool. No implements are needed to tighten or loosen tool 30. The electrodes 25 and 26 are then rotated and/or slid axially as needed to seat the ends of the electrode tips opposite to one another in the annular groove 46. Thereafter, while the ends of the tips are seated in annular groove 46, clamping screw 23 is tightened to fix the electrodes both axially and rotationally relative to the fuel supply pipe 12. Then, when tool 30 is replaced by nozzle 17, the spark gap will be set at the proper width and will be positioned at the proper axial and radial distances relative to nozzle outlet 18.

Another and more preferred way to complete the gap setting operation is as follows. After the threads of tool 30 are partially engaged with the threads of opening 15, the electrodes 25 and 26 are rotated until tips ends 28' and 29' rest opposite to one another against smooth cylindrical portion 32 of tool shank 27. The electrodes 25 and 26 then are slid axially relative to tool 30 so as to seat tip ends 28' and 29' in annular groove 46. Thereafter, while tip ends 28' and 29' are held in groove 46 by its outer wall 47, rotation of tool 30 is continued until the threads of tool 30 are fully engaged with the threads of opening 15 and stop flange 38 is in hand snug abutment with pipe end 16. Clamping screw 23 of fixture 20 is then tightened and tool 30 is replaced by nozzle 17 in the same manner as above. It is believed that this second gap setting and positioning method is more advantageous than the first because the further rotation of tool 30 with tips 28 and 29 held in the groove tends to seat tip ends 28' and 29' more firmly in the precise position required for exact adjustment of the spark gap.

While the best mode of the invention is shown in the accompanying drawings and described in detail in this specification, this mode represents only one specific example of the invention. Those skilled in the art will recognize that many variations, other than those described above, may be made in the construction and arrangement of the specific embodiment shown and described without departing from the scope of the invention as defined by the claims below.

I claim:

1. A tool for setting a spark gap between the free ends of the tips of a pair of electrodes for igniting a fuel discharge from the outlet of a discharge nozzle removably threaded into a seated position in a threaded opening at the end of a fuel supply pipe, said tool comprising:
   a shank having a smooth cylindrical portion at one end and a threaded portion at the other end for engaging said threaded opening of the fuel supply pipe;
   stop means adjacent the inner end of said threaded portion and extending radially outward for abutting said fuel supply pipe when said nozzle has been removed and said tool is threaded into a seated position in said threaded opening of the fuel supply pipe;
   a handle connected to said cylindrical portion of the shank, said handle and said shank forming an elongated tool body; and,
   shoulder means adjacent to said one end of the shank, said shoulder means including an annular face facing toward said other end of the shank and extending radially to a diameter substantially greater than the diameter of said smooth cylindrical shank portion, and inner and outer opposing walls extending transversely to said annular face to define an annular concave groove in said annular face for holding the ends of the tips of said electrodes in a seated position relative to each other as said body is rotated about its longitudinal axis with said threaded portion in engagement with the threads of said fuel supply opening, the position of said concave groove relative to said stop means being such that when said tool is in its said seated position said outer groove wall holds said seated tip ends radially against said inner groove wall to set said spark gap at a preselected width and the center of said spark gap at preselected radial and axial distances relative to the center of said fuel outlet when said nozzle has a preselected axial length relative to said end of the fuel supply pipe and is in its said seated position in place of said tool, said inner groove wall having a diameter such that said spark gap is set at said preselected width when said tip ends are in said seated position against said inner groove wall.

2. The tool of claim 1 for setting electrode tips which extend radially in a plane at an acute angle relative to the axis of said discharge outlet and are tapered adjacent to the free ends thereof, wherein the shape of said outer wall of the groove and the values of said acute angle and said taper are such that said outer wall holds said seated tip ends radially inward against said inner wall of the groove, and wherein said inner groove wall is formed by an extension of said smooth cylindrical portion of the shank.

3. The tool of claim 1 in which said handle includes an aperture passing therethrough for receiving a tether to hang said tool on a support when not in use.

4. The tool of claim 1 in which said handle includes a knurled portion providing a friction grip for a hand.

5. The tool of claim 1 which further comprises a gap measuring gauge mounted on said other end of the shank, said gauge having a transverse dimension corresponding to said preselected width of said spark gap as established by the diameter of said inner groove wall.

6. The tool of claim 1 in which said tool body is a single integral piece.

7. The tool of claim 1 in which said shoulder means forms a base of said handle, and said outer groove wall is provided by said handle base.

8. The tool of claim 7 in which said inner groove wall is provided by an extension o said smooth cylindrical portion of the shank.

9. A method for setting a spark gap between the free ends of the tips of a pair of electrodes for igniting a fuel discharge from the outlet of a discharge nozzle removably threaded into a seated position in a threaded opening at the end of a fuel supply pipe, each of said tips extending radially from a corresponding elongated electrode body mounted in a fixture means for adjustably fixing said electrode body over ranges of rotational and axial positions and the longitudinal axes of said elongated bodies being radially spaced from the axis of said discharge nozzle outlet, said method comprising:

axially aligning with said supply pipe opening a gap setting tool comprising a shank having a smooth cylindrical portion at one end and a threaded portion at the other end for engaging said threaded opening of the fuel supply pipe, stop means adjacent the inner end of said threaded portion and extending radially outward for abutting said fuel supply pipe when said nozzle has been removed and said tool is threaded into a seated position in said threaded opening of the fuel supply pipe, a handle connected to said cylindrical portion of the shank, said handle and said shank forming an elongated tool body, and shoulder means adjacent to said one end of the shank, said shoulder means including an annular face facing toward said other end of the shank and extending radially to a diameter substantially greater than the diameter of said smooth cylindrical shank portion, and inner and outer opposing walls concave groove in said annular face for holding the ends of the tips of said electrodes in a seated position relative to each other as said body is rotated about its longitudinal axis with said threaded portion in engagement with the threads of said fuel supply opening, the position of said concave groove relative to said stop means being such that when said tool is in its said seated position said outer groove wall holds said seated tip ends radially against said inner groove wall to set said spark gap at a preselected width and the center of said spark gap at preselected radial and axial distances relative to the center of said fuel outlet when said nozzle has a preselected axial length relative to said end of the fuel supply pipe and is in its said seated position in place of said too, said inner groove wall having a diameter such that said spark gap is set at said preselected width when said tip ends are in said seated position against said inner groove wall;

rotating said tool relative to said supply pipe opening so as to provide a partial engagement between the threads of said threaded portion of the tool and the threads of said fuel supply pipe opening;

seating the ends of said tips opposite to one another in said annular groove;

rotating said tool while said threads are engaged until said stop means abuts said fuel supply pipe to place said tool in its said seated position; and, causing said fixture means to fix said electrodes axially and rotationally relative to said fuel supply pipe opening while the ends of said tips are seated in said annular groove and said tool is in its said seated position.

10. The method of claim 9 in which said seating step includes the steps of:

rotating said electrode bodies until the ends of said tips rest opposite to one another against said cylindrical portion of said shank; and, sliding said tool and said electrode bodies axially relative to each other to seat said free tip ends in said annular groove.

11. The method of claim 10 which further includes the steps of:

removing said discharge nozzle from said fuel supply pipe opening prior to said partial engagement between the threaded portion of said tool and the threads of said fuel supply pipe opening;

loosening said fixture means to permit axial and rotational movement of said electrode bodies; and, removing said tool from engagement with the threads of said fuel supply pipe opening and threading said discharge nozzle in said fuel supply pipe opening in place of said removed tool after said fixing of said electrodes by said fixture means.

12. The method of claim 9 in which the free ends of said tips are seated in said groove before said stop means abuts said fuel supply pipe, said tip ends being maintained in sliding contact with said inner wall of the groove by said outer wall thereof while said tool is rotated from said partial threaded engagement to its said seated position.

* * * * *

UNITED STATES PATENT AND TRADEMARK OFFICE
CERTIFICATE OF CORRECTION

PATENT NO. : 4,791,734

DATED : December 20, 1988

INVENTOR(S) : Leonard S. Wojtkowiak

It is certified that error appears in the above-identified patent and that said Letters Patent is hereby corrected as shown below:

In column 7, line 43, delete "o" and insert --of--.

In column 8, line 21, change "too," to --tool,--.

Signed and Sealed this

Sixth Day of June, 1989

Attest:

DONALD J. QUIGG

Attesting Officer

Commissioner of Patents and Trademarks